(12) United States Patent
Davis et al.

(10) Patent No.: US 7,668,810 B2
(45) Date of Patent: Feb. 23, 2010

(54) CONTROLLING CONSISTENCY OF DATA STORAGE COPIES

(75) Inventors: Yufen Lin Davis, Tucson, AZ (US); Lisa Joan Gundy, Tucson, AZ (US); Gail Andrea Spear, Tucson, AZ (US); John Glenn Thompson, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 244 days.

(21) Appl. No.: 11/342,187

(22) Filed: Jan. 27, 2006

(65) Prior Publication Data

US 2007/0185928 A1 Aug. 9, 2007

(51) Int. Cl.
G06F 7/00 (2006.01)
(52) U.S. Cl. .......................................... 707/3
(58) Field of Classification Search ................. 707/203; 709/229
See application file for complete search history.

(56) References Cited

U.S. PATENT DOCUMENTS

| | | | | |
|---|---|---|---|---|
| 5,341,479 A * | 8/1994 | Dean et al. | ............. | 711/4 |
| 5,355,477 A * | 10/1994 | Strickland et al. | ............. | 707/8 |
| 5,546,579 A * | 8/1996 | Josten et al. | ............. | 707/8 |
| 5,566,319 A * | 10/1996 | Lenz | ............. | 711/147 |
| 5,734,818 A * | 3/1998 | Kern et al. | ............. | 714/20 |
| 5,787,247 A * | 7/1998 | Norin et al. | ............. | 709/220 |
| 6,145,006 A * | 11/2000 | Vishlitsky et al. | ............. | 709/229 |
| 6,247,099 B1 * | 6/2001 | Skazinski et al. | ............. | 711/141 |
| 6,493,796 B1 * | 12/2002 | Arnon et al. | ............. | 711/114 |
| 6,542,974 B2 * | 4/2003 | Gagne et al. | ............. | 711/154 |
| 6,611,901 B1 | 8/2003 | Micka et al. | ............. | 711/162 |
| 6,622,259 B1 * | 9/2003 | Schmuck | ............. | 714/4 |
| 6,754,682 B1 * | 6/2004 | LeCrone et al. | ............. | 707/204 |
| 6,772,309 B1 * | 8/2004 | Ohr et al. | ............. | 711/163 |
| 6,795,850 B2 * | 9/2004 | Wu et al. | ............. | 709/213 |
| 6,925,515 B2 * | 8/2005 | Burns et al. | ............. | 710/200 |
| 7,133,982 B2 * | 11/2006 | Werner et al. | ............. | 711/161 |
| 7,188,187 B2 * | 3/2007 | Hirabayashi et al. | ............. | 709/232 |
| 2003/0028695 A1 * | 2/2003 | Burns et al. | ............. | 710/200 |
| 2003/0236899 A1 * | 12/2003 | Otake | ............. | 709/229 |
| 2004/0193944 A1 * | 9/2004 | LeCrone et al. | ............. | 714/5 |
| 2004/0260726 A1 * | 12/2004 | Hrle et al. | ............. | 707/104.1 |
| 2004/0260736 A1 * | 12/2004 | Kern et al. | ............. | 707/204 |
| 2004/0260896 A1 | 12/2004 | Werner et al. | ............. | 711/162 |
| 2005/0071372 A1 * | 3/2005 | Bartfai et al. | ............. | 707/104.1 |
| 2005/0149683 A1 * | 7/2005 | Chong et al. | ............. | 711/162 |
| 2005/0160248 A1 * | 7/2005 | Yamagami | ............. | 711/170 |
| 2005/0198455 A1 * | 9/2005 | Yagawa et al. | ............. | 711/162 |
| 2006/0129556 A1 * | 6/2006 | Reuter | ............. | 707/8 |
| 2006/0136685 A1 * | 6/2006 | Griv et al. | ............. | 711/162 |
| 2007/0022267 A1 * | 1/2007 | Werner et al. | ............. | 711/162 |

* cited by examiner

*Primary Examiner*—Charles Rones
*Assistant Examiner*—Kurt Mueller
(74) *Attorney, Agent, or Firm*—John H. Holcombe

(57) ABSTRACT

A data storage system which copies data from source data storage volumes to target data storage volumes restricts a write operation to at least one source data storage volume (FREEZE), to prevent the updating of a source while the data of a consistency group of interdependent data is being copied. Program logic selects a source data storage volume to which the restriction applies as a verification volume; and the program logic responds to a verification request to first employ the verification volume to verify that the restriction remains in place with respect to the verification volume, and to allow a reset of the restriction (THAW).

9 Claims, 3 Drawing Sheets

CONTROLLING CONSISTENCY OF DATA STORAGE COPIES

DOCUMENT INCORPORATED BY REFERENCE

Commonly assigned U.S. Patent Application Publication No. US 2004/0260896 is incorporated for its showing of copying data from source storage to target storage, wherein the copy operations create a consistent copy of source storage data in the target storage, restricting a write operation on source storage during a copy operation.

FIELD OF THE INVENTION

This invention relates to copying of data from source data storage volumes to target data storage volumes, and, more particularly, the creation of consistent copies.

BACKGROUND OF THE INVENTION

Copying of data is useful for backup purposes to avoid the loss of data. As discussed in the incorporated '896 USPAP, in data storage systems, such as enterprise storage servers (ESS), for example, the IBM® TotalStorage Enterprise Storage Server™, there may be copy functions, one of which, such as FlashCopy™, that provides point-in-time copy functions. As discussed in the incorporated '896 USPAP, point-in-time copying techniques provide an instantaneous copy or view of what the original data looked like at a specific point in time.

The data may be interdependent such that data of one volume is dependent on data of another volume. However, source data may be subject to updating while the point-in-time data is being copied, and an update to some data that has not yet been copied may thus conflict with interdependent data that has already been copied, and, if the data not yet copied is then copied, the data is inconsistent, and essentially corrupted. In the incorporated '896 USPAP, while performing a copy operation to copy from a source to a target, a write operation is restricted from being performed on the one source, until the copy operations have been performed on the data that is interdependent.

The group of interdependent data that is being copied may be called a consistency group. The write restriction may be called a "FREEZE", and subsequent writes to the frozen source volume receive a "long busy" condition. When all of the consistency group relationships are established and the interdependent data is copied, a "consistency group created" command is issued to each logical subsystem, causing the "frozen" volumes to be "THAWED".

In order to keep from an unexpected problem, or a user forgetting to issue a thaw, a timer is started by ESS when the freeze is initiated. If a volume is not thawed within a specified amount of time, it will be automatically thawed, which may lead to an uncertainty whether the group is in fact consistent.

SUMMARY OF THE INVENTION

Data storage systems, data storage controls, and computer program products control the consistency of data storage copies.

In one embodiment, a data storage system comprises data storage configured to store a plurality of source data storage volumes; data storage configured to store a plurality of target data storage volumes; and program logic configured to respond to a restriction of a write operation to at least one source data storage volume (FREEZE), to select, as a verification volume, a source data storage volume to which the restriction applies, the restriction based on a copy operation to establish a consistency group, the copy operation conducted between at least one source data storage volume and at least one target data storage volume; the program logic configured to respond to a verification request to first employ the verification volume to verify that the restriction remains in place with respect to the verification volume, and to allow a reset of the restriction (THAW).

In a further embodiment, the restriction is verified by a query to detect a "long busy" condition with respect to the verification volume.

In another embodiment, the program logic is additionally configured to allow a user to specify criteria for selection of a source data storage volume as the verification volume.

In still another embodiment, the verification volume is the initial source data storage volume of the restriction.

For a fuller understanding of the present invention, reference should be made to the following detailed description taken in conjunction with the accompanying drawings.

DETAILED DESCRIPTION OF THE INVENTION

This invention is described in preferred embodiments in the following description with reference to the Figures, in which like numbers represent the same or similar elements. While this invention is described in terms of the best mode for achieving this invention's objectives, it will be appreciated by those skilled in the art that variations may be accomplished in view of these teachings without deviating from the spirit or scope of the invention.

Figure 1:
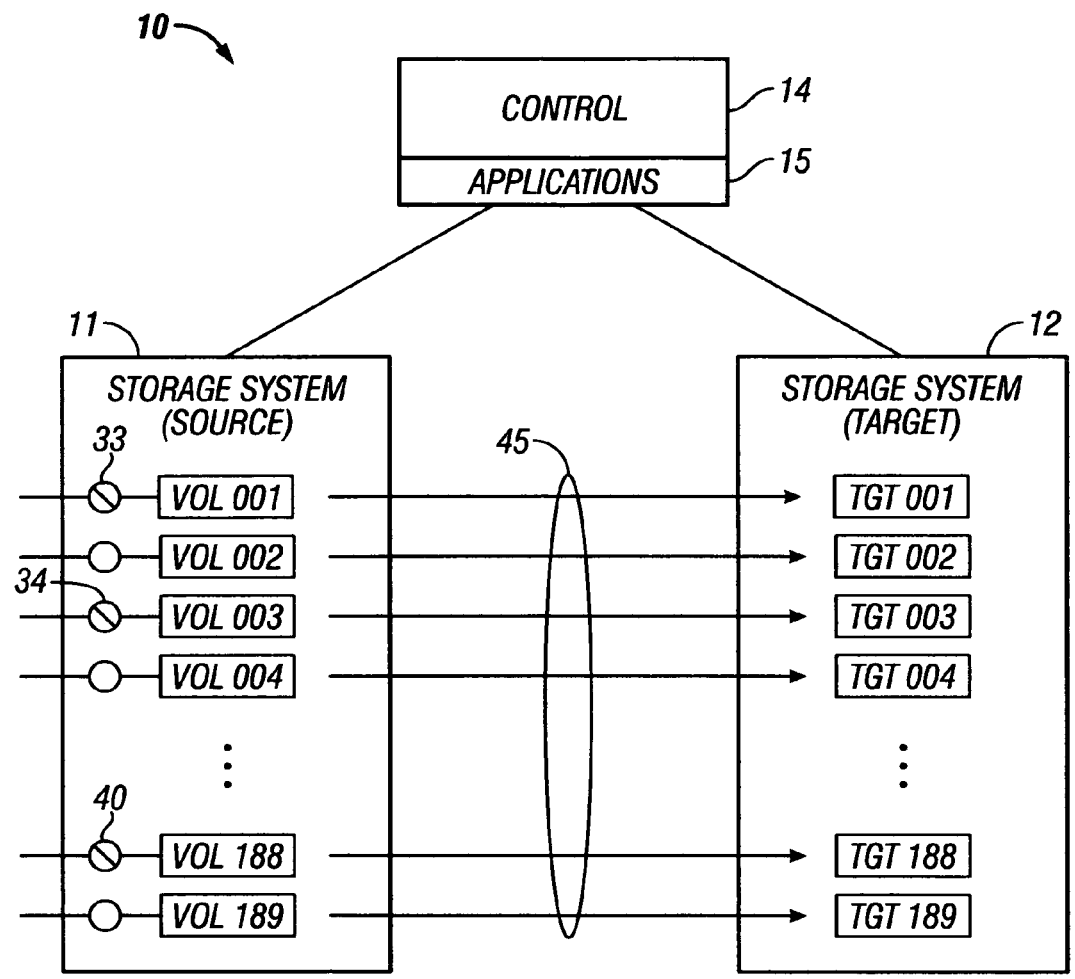
FIG. 1 is a diagrammatic illustration of operation of a data storage system in accordance with the present invention.

Referring to FIG. 1, a data storage system 10 comprises a logical storage system 11 for "source" data, comprising source volumes, and a logical storage system 12 for storing copied data, comprising "target" volumes. A control 14 comprises program logic and computer readable medium 15 configured for copying of data from the source volumes to the target volumes, for example, in a point-in-time copying arrangement. The data storage system, or each of the logical storage systems 11 and 12, may comprise enterprise storage servers (ESS), as discussed above.

The illustrated source and target volumes may be physical volumes or may be logical volumes of data, with any desired headers, etc., arranged on various physical data storage devices, such as RAID (Redundant Array of Independent Disks) systems of logic and disk drives, as are known to those of skill in the art.

As discussed in the incorporated '896 USPAP, point-in-time copying techniques provide an instantaneous copy or view of what the original data looked like at a specific point in time. Typically, both the source and the target volumes reside on the same ESS system, although implementations may be possible where the source and target volumes reside on different ESS systems.

A point-in-time copy initially comprises dual pointers to the data on the source volumes, so that a host system write operation may be satisfied with a write complete, in that there are primary and backup means to access the physical data, creating the impression that the data is backed up. Additionally, a RAID system typically provides enough redundancy to the data that its continued availability is assured. With the satisfaction of the write operation of the host system, the physical copying of the data to the target volumes can then be accomplished on an asynchronous basis. Once the write operation is complete, the host system may then update some or all of the data of the source volumes.

The data may be interdependent such that data of one volume is dependent on data of another volume. However, source data may be subject to updating while the point-in-time data is being copied, and an update to some data that has not yet been copied may thus conflict with interdependent data that has already been copied, and, if the data not yet copied is then copied, the data is inconsistent, and essentially corrupted. In the incorporated '896 USPAP, while performing a copy operation to copy from a source to a target, a write operation is restricted from being performed on the one source, until the copy operations have been performed on the data that is interdependent. This may be called a FlashCopy "establish".

The group of interdependent data that is being copied may be called a consistency group. The write restriction may be called a "FREEZE", and subsequent writes to the frozen source volume(s) receive a "long busy" condition. When all of the consistency group relationships are established, a "consistency group created" command is issued to each logical subsystem. The data is copied to the target volumes, the pointers are changed, and the "frozen" volumes are "THAWED".

In order to keep from having an unexpected problem, or in the case of a user forgetting to issue a thaw, a timer may be started by the ESS when the freeze is initiated. If a volume is not thawed in a specified amount of time, it will be automatically thawed by the microcode. It is thus difficult to know positively that the last FlashCopy establish was done prior to the time expiring for the first volume that was frozen.

Referring to FIGS. 1 and/or 2, a FlashCopy may be initiated with the freeze option, indicating that it is creating a consistency group of step 20. In step 25, the control selects a source volume to be a verification volume. The selection of a source data storage volume as the verification volume may be made in accordance with criteria specified by a user in step 26. For example, a GUI may be provided at a host system or an input station of the data storage system for input by the user. Alternatively, the selection may be made in accordance with default criteria 28.

In step 25, the selection criteria may be to select the initial source data storage volume of the write restriction. The selection may comprise saving the device number of volume serial number of the selected source volume.

In step 30, the control 14 continues to establish the relationships between the source data volumes, and issues write restrictions for the consistency group. In the example, the initial source data storage volume to which a write restriction 33 (FREEZE) applies is VOL001, with its corresponding target volume TGT001. VOL002 does not comprise a part of the consistency group and may be copied to TGT002 without a write restriction. VOL003 is interdependent with respect to VOL001 and therefore may have a write restriction 34 applied, and, when the relationships are established, will be part of the consistency group of VOL001, TGT001, VOL003, and corresponding target volume TGT003. The process of step 30 will continue, to include all of the interdependent volumes, such as source volume VOL188 with a write restriction 40, and target volume TGT188 in the consistency group. The write restrictions or FREEZE, for example, comprise invoking instructions such that subsequent writes to the source receive a "long busy" condition. The long busy condition from the control 14 causes the host system to queue an intended write to the volume. At substantially the same time, data will begin to be transferred to the target volumes TGT001-TGT189, as illustrated by the arrows 45.

Once all relationships have been established for the consistency group, the host software issues a command indicating that the consistency group has been created, and that verification is required. Referring to FIGS. 1 and/or 3, in step 50, the control 14 responds to the verification request to, in step 52, first employ the verification volume, such as volume VOL001, by invoking a query to verify, in step 53, that the write restriction 33 remains in place with respect to the verification volume. For example, the query may check whether the "long busy" condition is still in place with respect to the verification volume. If the restriction 33 remains in place, "YES" in step 53, in step 55, the control 14 indicates that a consistency group has been verified, and, in step 56, the control allows a reset of the restriction (THAW). The indication of a consistency group may comprise a message sent, or made available to, a host and/or one or both storage systems.

If the restriction is not in place, "NO" in step 53, in step 58, the control 14 will not verify the consistency group. This may comprise an error condition in which the consistency group data may have been corrupted, for example, by expiration of a timer that prematurely reset the write restriction. The write restrictions of other volumes may also have been reset. The data of the verification volume, and possibly other volumes, may or may not have been overwritten or updated. The control may then undertake measures to limit any potential corruption of the data. Control 14 then proceeds to step 56 and allows a reset of the restriction (THAW).

The described operations may be implemented as systems, apparatus, processors, program logic and/or computer program products using known programming and/or engineering techniques to produce software, firmware, hardware, or any combination thereof. The control 14 comprises computer processor, logic and/or one or more microprocessors with computer readable medium 15 for storing information and program instructions for operating the microprocessor(s). Herein "processor" or "program logic" and "computer readable medium" may comprise any suitable computer processor, logic, microprocessor, and associated memory for responding to program instructions, and the associated computer readable medium may comprise fixed and/or rewritable memory or data storage devices or apparatus. The program instructions comprise computer readable program code and may be supplied to the controller or computer readable medium from a host or via a data storage drive, or by an input from a floppy or optical disk, or by being read from a cartridge, or by a web user interface or other network connection, or by any other suitable means, themselves also comprising herein "computer readable medium".

Figure 2:
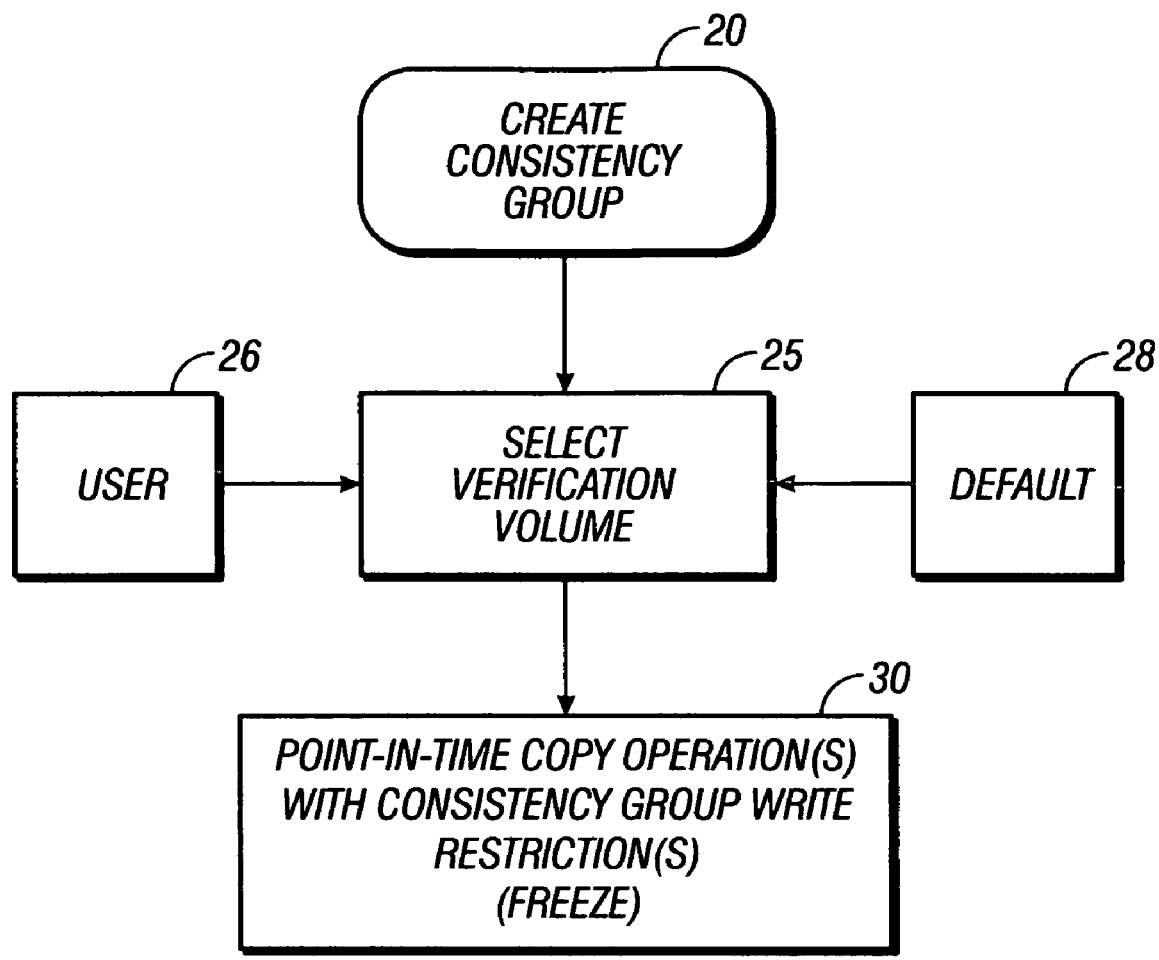
FIG. 2 is a flow chart depicting copy operation(s) with a consistency group with the data storage system of FIG. 1.
Figure 3:
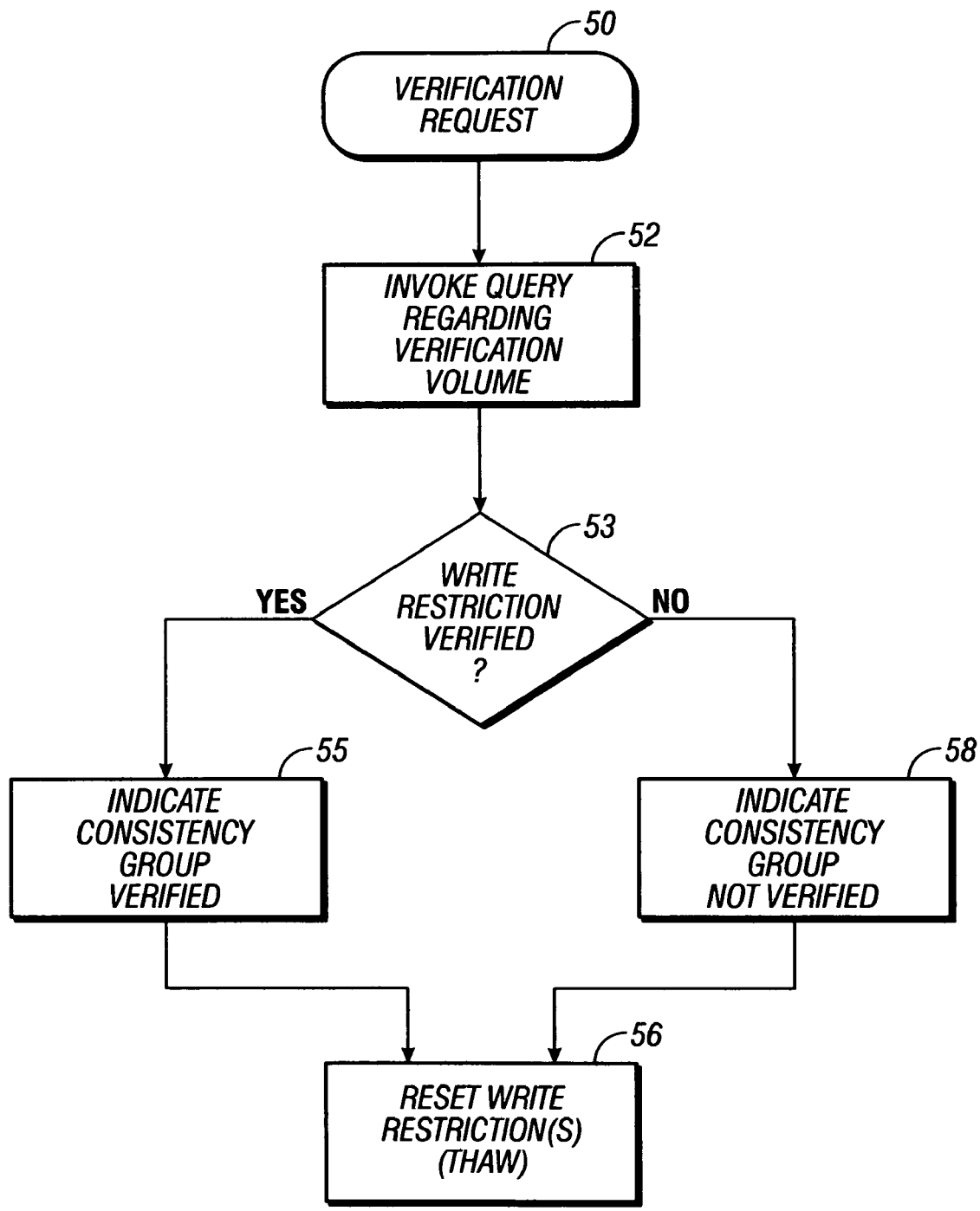
FIG. 3 is a flow chart depicting verification of write restriction with the data storage system of FIG. 1.

Those of skill in the art will understand that changes may be made with respect to the flow charts of FIGS. 2 and 3. Further, those of skill in the art will understand that differing specific component arrangements may be employed than those illustrated herein.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A data storage system, comprising:
   (A) data storage configured to store a plurality of source data storage volumes;
   (B) data storage configured to store a plurality of target data storage volumes; and
   (C) data storage control comprising at least one processor configured to:
      (1) respond to a separately initiated creation of a restriction of a copy operation to a plurality of source data storage volumes, said restriction based on said copy operation to establish a consistency group, said copy operation conducted between at least one said source data storage volume and at least one said target data storage volume;
      (2) select a source data storage volume from said plurality of source data storage volumes to which said restriction applies as a verification source data storage volume to verify whether said restriction remains in place; and
      (3) respond to a verification request to first employ said verification source data storage volume to verify that said restriction remains in place with respect to said verification source data storage volume, by:
         (i) if said restriction remains in place at said verification source data storage volume, providing a message verifying said restriction remains in place, and allowing a reset of said restriction; or
         (ii) if said restriction does not remains in place at said verification source data storage volume, providing a message verifying said restriction does not remain in place, and not allowing a reset of said restriction.

2. The data storage system of claim 1, wherein said data storage control is additionally configured to allow a user to specify criteria for selection of a source data storage volume as said verification volume.

3. The data storage system of claim 1, wherein said verification volume is the initial source data storage volume of said restriction.

4. A data storage control system configured for use with a data storage system, said data storage system comprising data storage configured to store a plurality of source data storage volumes, and data storage configured to store a plurality of target data storage volumes; said data storage control system comprising:
   (A) an apparatus for copying data from said source data storage volumes to said target data storage volumes;
   (B) a control apparatus comprising at least one processor configured to:
      (1) respond to a separately initiated creation of a restriction of a copy operation to a plurality of source data storage volumes, said restriction based on said copy operation of said apparatus to establish a consistency group, said copy operation conducted between at least one said source data storage volume and at least one said target data storage volume;
      (2) select a source data storage volume from said plurality of source data storage volumes to which said restriction applies as a verification source data storage volume to verify whether said restriction remains in place; and
      (3) said control apparatus configured to respond to a verification request to first employ said verification source data storage volume to verify that said restriction remains in place with respect to said verification volume, by:
         (i) if said restriction remains in place at said verification source data storage volume, providing a message verifying said restriction remains in place, and allowing a reset of said restriction; or
         (ii) if said restriction does not remains in place at said verification source data storage volume, providing a message verifying said restriction does not remain in place, and not allowing a reset of said restriction.

5. The data storage control system of claim 4, wherein said control apparatus is additionally configured to allow a user to specify criteria for selection of a source data storage volume as said verification volume.

6. The data storage control system of claim 4, wherein said verification volume is the initial source data storage volume of said restriction.

7. A computer program product computer readable storage medium usable with a programmable computer, said computer program product tangibly embodying computer readable code for use with a data storage system, said data storage system comprising data storage configured to store a plurality of source data storage volumes, and data storage configured to store a plurality of target data storage volumes; wherein data is copied from said source data storage volumes to said target data storage volumes; comprising instructions for:
   (A) operating said programmable computer to respond to a separately initiated creation of a restriction of a copy operation to a plurality of source data storage volumes, said restriction based on said copy operation of said programmable computer to establish a consistency group, said copy operation conducted between at least one said source data storage volume and at least one said target data storage volume;
   (B) selecting a source data storage volume from said plurality of source data storage volumes to which said restriction applies as a verification source data storage volume to verify whether said restriction remains in place; and
   (C) operating said programmable computer to respond to a verification request, first verifying that said restriction remains in place with respect to said verification source data storage volume by:
      (i) if said restriction remains in place at said verification source data storage volume, providing a message verifying said restriction remains in place, and allowing a reset of said restriction; or
      (ii) if said restriction does not remains in place at said verification source data storage volume, providing a message verifying said restriction does not remain in place, and not allowing a reset of said restriction.

8. The computer program product of claim 7, additionally comprising instructions to operate said programmable computer to allow a user to specify criteria for selection of a source data storage volume as said verification volume.

9. The computer program product of claim 7, wherein said verification volume is the initial source data storage volume of said restriction.

* * * * *